US012658056B1

(12) United States Patent
Warnick et al.

(10) Patent No.: US 12,658,056 B1
(45) Date of Patent: Jun. 16, 2026

(54) SYSTEM AND METHOD FOR AUTONOMOUS VEHICLE ASSISTANCE

(71) Applicant: UIPCO, LLC, San Antonio, TX (US)

(72) Inventors: Mark Paxman Warnick, San Antonio, TX (US); Ashley Raine Philbrick, San Antonio, TX (US); Tawana Lynn Leak, San Antonio, TX (US); Elena Marie Carrasco, Converse, TX (US); Will Kerns Maney, Jr., New York City, NY (US); Justin Royell Nash, Little Elm, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 161 days.

(21) Appl. No.: 18/466,387

(22) Filed: Sep. 13, 2023

Related U.S. Application Data

(60) Provisional application No. 63/375,420, filed on Sep. 13, 2022.

(51) Int. Cl.
*G08G 1/00* (2006.01)
*G08G 1/0967* (2006.01)

(52) U.S. Cl.
CPC ....... *G08G 1/202* (2013.01); *G08G 1/096725* (2013.01); *G08G 1/096741* (2013.01)

(58) Field of Classification Search
CPC ............. G08G 1/202; G08G 1/096725; G08G 1/096741
See application file for complete search history.

(56) References Cited

U.S. PATENT DOCUMENTS 8,116,906 B2 2/2012 Valerino, Sr.
10,579,070 B1 * 3/2020 Konrardy ........... G01C 21/3438
11,922,365 B1 3/2024 Kunjukrishnan
2005/0128080 A1 6/2005 Hall
2005/0265794 A1 12/2005 Menday
2006/0220842 A1 10/2006 Breed
2006/0232417 A1 10/2006 August
2012/0173045 A1 7/2012 Conroy
2012/0209421 A1 8/2012 Valerino, Sr.
2014/0166745 A1 6/2014 Graef
2014/0266668 A1 9/2014 Blankenship
2015/0272825 A1 10/2015 Lim
2015/0274441 A1 10/2015 Jones
2015/0302678 A1 10/2015 Blake
2016/0200526 A1 7/2016 Tagashira
2017/0372040 A1 12/2017 Valerino
(Continued)

OTHER PUBLICATIONS

U.S. Appl. No. 18/458,431, filed Aug. 30, 2023.
(Continued)

*Primary Examiner* — Hussein Elchanti
(74) *Attorney, Agent, or Firm* — Plumsea Law Group, LLC

(57) ABSTRACT

A roadside assistance management system for autonomous vehicles (AVs) is disclosed. The roadside assistance management system monitors and manages a plurality of AVs which are used in the transport of various items such as cash from one location to another. Each AV can request specific types of assistance. Upon receiving such a request, the roadside assistance management system can dispatch one or more additional AVs to the render assistance to the requesting AV.

14 Claims, 12 Drawing Sheets

(56) References Cited

U.S. PATENT DOCUMENTS

| | | | | |
|---|---|---|---|---|
| 2018/0152835 | A1 | 5/2018 | Kurian | |
| 2019/0236959 | A1 | 8/2019 | Belapurkar et al. | |
| 2020/0361721 | A1 | 11/2020 | Lathan | |
| 2021/0056342 | A1 | 2/2021 | Nash | |
| 2021/0197673 | A1* | 7/2021 | Espig | B60L 53/53 |
| 2022/0051209 | A1* | 2/2022 | Kolls | G05D 1/021 |
| 2022/0063883 | A1 | 3/2022 | Mott | |
| 2022/0291695 | A1* | 9/2022 | Hatori | G08G 1/202 |
| 2024/0140229 | A1* | 5/2024 | Kromrey | H02J 7/0042 |

OTHER PUBLICATIONS

U.S. Appl. No. 18/458,444, filed Aug. 30, 2023.

Non-Final Office Action issued in U.S. Appl. No. 17/103,591, dated May 12, 2022, 31 pages.

Notice of Allowance issued in U.S. Appl. No. 17/103,591, dated Sep. 14, 2022, 7 pages.

Non-Final Office Action mailed Apr. 7, 2025 for U.S. Appl. No. 18/458,431.

Office Action mailed Jul. 2, 2025 for U.S. Appl. No. 18/458,444.

Non-Final Office Action mailed Sep. 17, 2025 for U.S. Appl. No. 18/458,431.

Final Office Action mailed Jan. 30, 2026 for U.S. Appl. No. 18/458,444.

* cited by examiner

SYSTEM AND METHOD FOR AUTONOMOUS VEHICLE ASSISTANCE

CROSS-REFERENCE TO RELATED APPLICATION

This application claims the benefit of U.S. Provisional Patent Application Ser. No. 63/375,420 filed on Sep. 13, 2022 and titled "System and Method for Autonomous Vehicle Assistance", the disclosure of which is incorporated by reference herein in its entirety.

TECHNICAL FIELD

This disclosure relates to autonomous vehicles in general, and more particularly to the monitoring of certain conditions related to the autonomous operation of the vehicle system and dispatching helper vehicles based on the monitored conditions.

BACKGROUND

As the automobile industry continues to expand automated navigation and control features of vehicles, traditional commuter vehicles (e.g., traditional cars) that are controlled (e.g., navigated, steered) primarily by a human user may become less prevalent. Indeed, vehicles that are controlled primarily by a human user may eventually become obsolete. However, certain facets of these autonomous vehicles being on the road without human occupancy also leave them more vulnerable. For example, autonomous vehicles may break down and require roadside assistance, or become the target of attack by human-driven vehicles. Indeed, vehicles have increasingly been used for various criminal acts and in particular theft and vandalism.

Accordingly, there is a need in the art for a system and method that addresses these shortcomings discussed above.

SUMMARY

In one aspect, embodiments include a method of providing roadside assistance using a fleet of autonomous vehicles. The method includes a first step of receiving, at a vehicle assistance management system, a first request for aid transmitted by a first autonomous vehicle (AV) at a first location, and a second step of accessing, by the vehicle assistance management system, a vehicle fleet database to identify a second AV currently within a vicinity of the first AV. In addition, a third step includes dispatching, by the vehicle assistance management system, the second AV to the first location with instructions to render assistance to the first AV based on the first request, and a fourth step includes receiving, at the vehicle assistance management system, a confirmation message from the first AV indicating an arrival of the second AV at the first location.

In another aspect, embodiments include a method of protecting one or more items carried by an autonomous vehicle. The method can include a first step of receiving, at a vehicle assistance management system, a first request for aid transmitted by a first autonomous vehicle (AV) indicating a potential security threat by an unauthorized vehicle, and a second step of accessing, by the vehicle assistance management system, a vehicle fleet database to identify a second AV currently within a vicinity of the first AV. In addition, the method can include a third step of dispatching, by the vehicle assistance management system, the second AV to a first location with instructions to form a buffer zone directly around the first AV, and a fourth step of receiving, at the vehicle assistance management system, a confirmation message from the second AV indicating the second AV is physically disposed between the first AV and the unauthorized vehicle.

In yet another aspect, embodiments include a system providing roadside assistance using a fleet of autonomous vehicles, the system that including a processor and machine-readable media including instructions which, when executed by the processor, cause the processor to (1) receive, at a vehicle assistance management system, a first request for aid transmitted by a first autonomous vehicle (AV) at a first location; (2) access, by the vehicle assistance management system, a vehicle fleet database to identify a second AV currently within a vicinity of the first AV; (3) dispatch, by the vehicle assistance management system, the second AV to the first location with instructions to render assistance to the first AV based on the first request; and (4) receive, at the vehicle assistance management system, a confirmation message from the first AV indicating an arrival of the second AV at the first location.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings, like reference numerals designate corresponding parts throughout the drawings.

DESCRIPTION OF EMBODIMENTS

Figure 1:
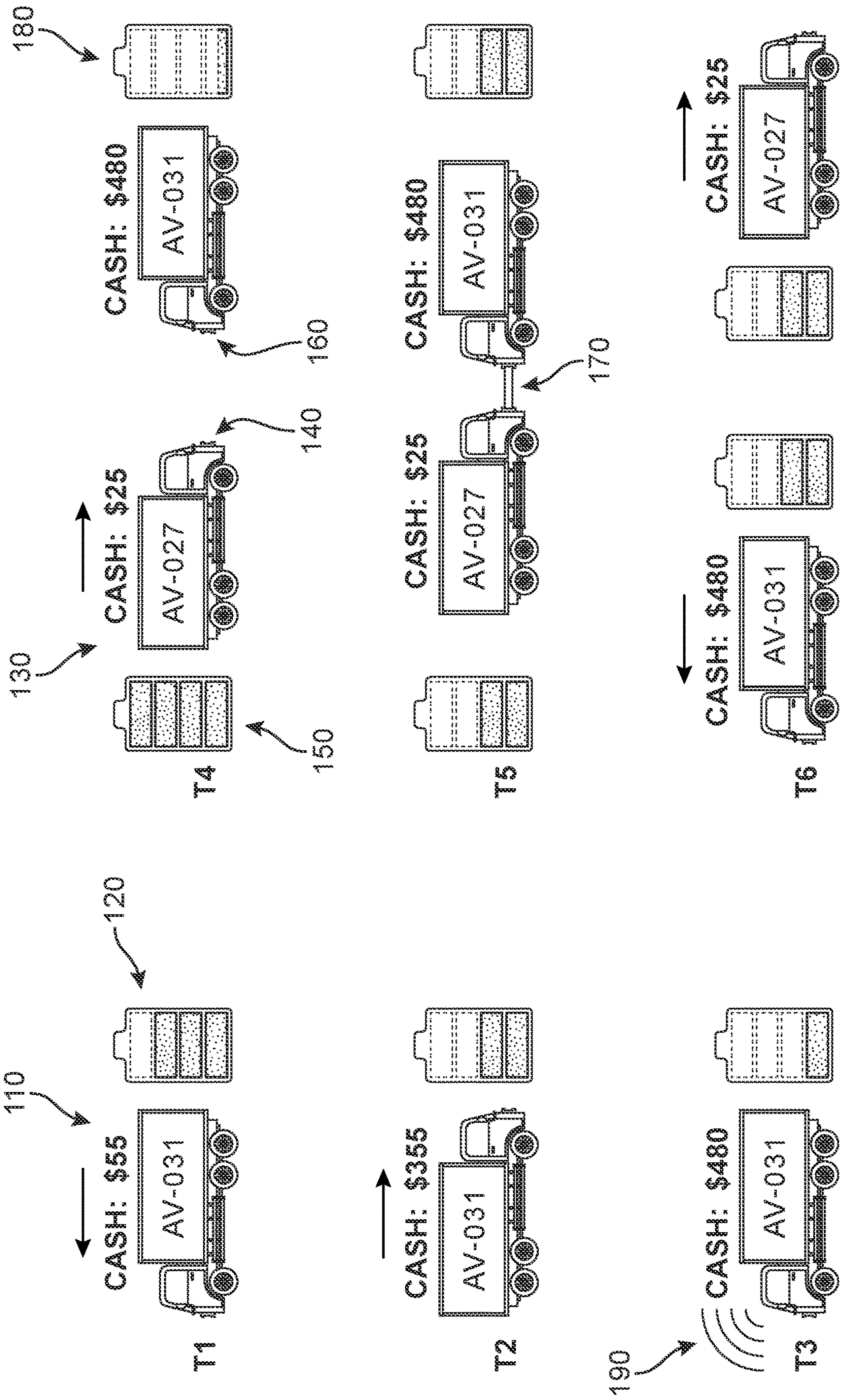
FIG. 1 is a depiction of a depleted battery for a first autonomous vehicle (AV) being charged by a second AV that has been dispatched by a roadside assistance system, according to an embodiment.

The proposed embodiments describe a system and method involving a roadside assistance and security service for autonomous vehicles (AVs) transporting payloads of cash and other valuable or sensitive items. In order to facilitate assistance to these autonomous vehicles, the proposed transport systems, a remote roadside assistance system can receive requests for assistance from one AV of a fleet of AVs. One example includes an unexpected low power situation. In this case, a different AV in the fleet of AVs can be dispatched to assist the vehicle in distress by transferring power or towing the distressed vehicle to an appropriate location. As another example, one AV carrying a valuable payload may detect that it is being followed or chased by an unauthorized vehicle. In this case, other AVs in the fleet can be dispatched and come to the chased AVs assistance. The other AVs can, for example, create a barrier between the targeted AV and the unauthorized vehicle that is attempting to follow the target, surround the unauthorized vehicle, and/or photograph and document the unauthorized vehicle and the driver for tracking purposes. In different embodiments, the remote controller can be configured to monitor, for each AV in its fleet, certain conditions related to the autonomous operation of the vehicle system and based on the monitored conditions and/or signals or messages received from the AVs, dispatching one or more secondary AVs to assist a primary AV if the primary AV has encountered an issue that cannot be resolved without external assistance. For example, in different embodiments, autonomous vehicles of different types (e.g., first type, second type, third type) are grouped according to vehicle classification. It should be understood that other factors or parameters may be used to group autonomous vehicles according to different types. For example, in other embodiments, autonomous vehicle types may be grouped based on vehicle weights (e.g., curb weights or gross axle weights), vehicle dimensions (e.g., length, width, height, etc.), crash-worthiness ratings, material composition (e.g., steel, aluminum, etc.), value or repair costs, or other criteria. Thus, in a given geographic area, the system may have access to include hundreds, thousands, or more individual autonomous vehicles that are available for use to dispatch for roadside assistance and protection.

Some examples of systems and methods and apparatuses whereby the following embodiments may be implemented are described in further detail in U.S. Patent Application No. 63/373,868, filed on Aug. 30, 2022 and titled "Smart Canister for Pneumatic Systems" to Mark Paxman Warnick, et al. (hereinafter the Smart Canister application), the disclosure of which is incorporated by reference in its entirety, and U.S. Patent Application No. 63/373,880 filed on Aug. 30, 2022 and titled "Automatic Cash Balancing Using Canister Exchange Hubs" to Mark Paxman Warnick, et al. (hereinafter the Cash Balancing application), the disclosure of which is incorporated by reference in its entirety. The embodiments described herein may apply the techniques and devices described in both applications.

As a general matter, an AV refers to a vehicle configured to drive itself, unpiloted, to a location according to received instructions. Accordingly, in some embodiments, each vehicle of the fleet includes a device processor and a non-transitory computer readable medium including instructions executable by the device processor. For example, the computer readable medium on each vehicle may include instructions for receiving and executing dispatch instructions by autonomously driving to a location designated by a user. Further, the computer readable medium on each vehicle may include instructions for providing the one or more services to the user at the designated location.

For purposes of introduction, an overview of one embodiment of the proposed systems and methods is illustrated with reference to FIG. 1. A simplified diagram representing a first AV 110 (shown with an identifier marking "AV-031" for purposes of reference) and its corresponding battery levels are presented at six different times (T1-T6) in FIG. 1. At a first time T1, the first AV 110 is shown in operation, carrying a payload of $55 in cash, for example from a first canister hub to a second canister hub. Its first onboard battery 120 is at a nearly-full charge level at this time. At a second time T2, as the first AV 110 continues its operations and increases its payload (e.g., after retrieving one or more canisters from the second canister hub) to $355, the first onboard battery 120 falls to a mid-charge level. Later that day, at a third time T3, after stopping at another canister hub and increasing its payload to $480, the first onboard battery 120 capacity has fallen to a near-empty charge level. While AVs can typically plan their routes and charging stops in advance to avoid such scenarios, in some cases—for example, where there is unexpected traffic or roadwork with stop and go traffic and/or lengthy detours—the depletion may occur nevertheless, and an emergency charging session required.

Figure 2:
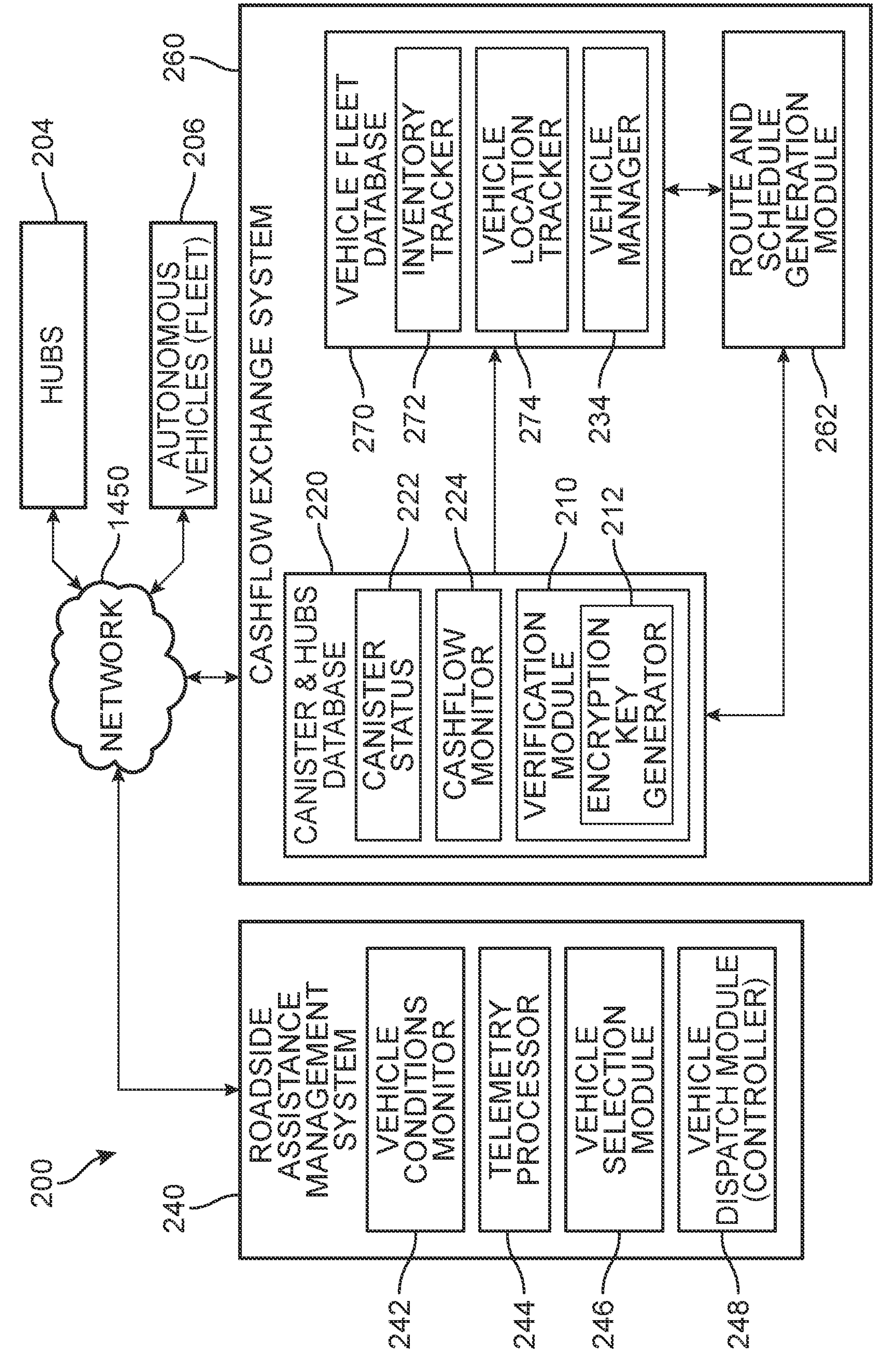
FIG. 2 is a schematic diagram depicting an environment including a roadside assistance system and a cashflow exchange system that may be hosted in the cloud, according to an embodiment.

During its operations the first AV 110 may transmit real- or near-real-time telemetry updates 190 to a remote roadside assistance management system (see FIG. 2). As a general matter, it should be understood that telematics generally refers to analysis of data that are based on information flowing to and/or from a vehicle. For example, vehicle telematics can refer to automobile systems that combine Global Positioning System (GPS) tracking and other wireless communications for automatic roadside assistance and remote diagnostics. When implemented, telematics have the potential to increase operational efficiency and improve vehicle safety in a number of ways. For example, GPS technology can be used to track a vehicle's location, mileage, and speed. Communications technology promotes connectivity between the AVs and other parties such as the remote dispatcher/controller. Sensors monitor vehicle operations and conditions which can then be used to streamline vehicle maintenance, or facilitate seeking assistance for the vehicle. For example, accelerometers measure changes in speed and direction, and cameras can monitor road conditions, and other drivers' actions. Additional sensor devices may monitor and/or determine vehicle fuel efficiency, remaining battery charge (e.g., utilized to power a vehicle's transmission and other operations) and/or battery charge consumed for a one or more vehicle trips.

In the example of FIG. 1, an onboard telematics device exchanges information in near real-time, or non-real-time, directly or indirectly, through one or more networks and/or intermediary devices, with the remote roadside assistance management system. As used herein, telematics broadly refers to the integrated use of telecommunications and informatics. More specifically, and as mentioned above, telematics refers to the receiving, storing, processing and sending of information via telecommunication devices, such as the telematics devices. As likewise used herein, a device used in a telematics system may comprise an On Board Device (OBD) which preferably connects to a vehicles Engine Control Unit (ECU), a smart phone device, a laptop computer, a tablet computer, a personal digital assistant (PDA), V2V devices, V21 device, wearable computing devices, a mobile telephone, or any device operable to receive, process, store, and transmit information. Likewise, a telematics system device may also comprise a navigation device or a geographic positioning system (GPS), such as embodied in a GPS satellite and a GPS base station attached to a physical network or wireless network.

Skilled practitioners of the art will be aware that the use of telematics has more recently been related to the integration of GPS technology with computers and mobile communications technology in automotive navigation systems. When used in such systems, telematics is more commonly referred to as vehicle telematics. One application of vehicle telematics is to monitor the location and movement of a vehicle. This monitoring is commonly achieved through a combination of a GPS receiver and a transmitting device, such as a Global System for Mobile communication (GSM) General Packet Radio Service (GPRS) modem or a Short Message Service (SMS) transmitter.

In various embodiments, data related to the AV's traversal of a route is provided by the telematics device to the remote roadside assistance management system. In one embodiment, the data is provided by the telematics device directly to the remote roadside assistance management system through a wireless connection to a cell tower of the wireless network, which is likewise connected to physical network. In yet another embodiment, the data is indirectly provided by the telematics device to the remote roadside assistance management system through an intermediary device, which in turn is connected to the physical network. It will be apparent to skilled practitioners of the art that many such embodiments are possible for the receipt, storage, processing, and transmittal of onboard vehicle sensor information by the telematics devices, and the foregoing are not intended to limit the spirit, scope or intent of the disclosure.

In various embodiments, the telematics device determines the current location of an autonomous vehicle of an autonomous vehicle fleet associated with the remote roadside assistance management system. In one embodiment, the current location is determined by using GPS technology, such as that provided by the GPS base station and GPS satellite, implemented in a vehicle navigation system. In another embodiment, the current location is automatically determined by the telematics device. In yet another embodiment, the current location is provided to the telematics device by based on external images captured by onboard cameras identifying street names or merchants. Once determined, the current location of the AV is submitted to the remote roadside assistance management system, directly or indirectly, by the telematics device.

In addition to location data, the first AV transmits its battery levels to the remote roadside assistance management system. In response, the roadside assistance management system assesses its records in the vehicle fleet database and determines there is another AV (shown in FIG. 1 at a fourth time T4 as a second AV 130) in a certain close range or vicinity of the first AV 110. For purposes of this application, "vicinity" of a vehicle refers to a predefined boundary or parameter of time and/or distance that can be applied by the roadside assistance management system to calculate whether there are additional AVs close enough to realistically dispatch to aid a primary AV. Thus, a secondary AV in vicinity of a primary AV can refer to (a) a secondary AV that is currently located within "X" miles of the primary AV, and/or (b) a secondary AV that is currently located-based on real-time traffic and roadwork conditions-within an "X" minutes driving time from the primary AV. In cases where multiple AVs match the criteria, the roadside assistance management system can include an optimization module to identify the AV that is nearest and/or would be best suited to performing the required assistance operation based on the telemetry data and/or help message received from the first AV.

In FIG. 1, the second AV 130 has been identified by the roadside assistance management system as being in vicinity of the first AV 110 and capable of rendering assistance, and so the roadside assistance management system has dispatched the second AV 130 to meet the first AV 110 at its current location ("site"). Upon arriving at fourth time T4, at the site where the first AV 110 is parked, the second AV 130, carrying a payload of $25, with a second onboard battery 150 capacity at a nearly-full level, approaches one side of the first AV 110 in order to automatically initiate a charging connection via a first connection arm 140 which can represent any mechanism by which an electrical connection can be formed between two vehicles (while the first onboard battery has dropped to a nearly-empty level 180). At a fifth time T5, the first connection arm 140 protrudes out from the second AV 130 and docks with a port 160 formed on an exterior surface of the first AV 110 and initiates a charging session. At a sixth time T6, the two vehicles can automatically disconnect, as the first AV 110 has a sufficient charge and can travel to its next destination.

Referring now to FIG. 2, a schematic diagram representing an embodiment of a vehicle management environment 200 including a roadside assistance management system ("assistance system") 240 that is configured to be in communication with one or more hubs 204, fleet autonomous vehicles 206, and components of a cashflow exchange system 260 is depicted. As described in the Cash Balancing application, in different embodiments, the cashflow exchange system 260 is configured to perform a variety of operations that manage, support, monitor, and control the activity of hubs 204 and the network of autonomous vehicles 206. Similarly, assistance system 240 can be included in cashflow exchange system 260 or be a separate system as shown in FIG. 2 that interacts with cashflow exchange system.

Internet cloud-based hardware server(s) can be used to host the cashflow exchange system 260 or one or more components thereof. Each of the devices and components shown in environment 200 can communicate with each other and with other components of environment 200 over one or more networks (shown here as network 250). The network 250 may comprise any number of electronic devices and use any number of communication protocols to facilitate data communications within the network 250. One having skill in the art would appreciate that the network 250 may include a variety of internal and/or external networks of various types implementing various data communications technologies. The communication over the network may be performed in accordance with various communication protocols such as Transmission Control Protocol and Internet Protocol (TCP/IP), User Datagram Protocol (UDP), and IEEE communication protocols. The network 250 can include a wireless (e.g., Wi-Fi, Bluetooth®) or wired data network, a cellular network, a telecommunications network, an enterprise network, an application-specific public network, a Local Area Network (LAN), a Wide Area Network (WAN), WLAN, MAN, a private network, a public network such as the Internet, an ad-hoc network, a network that includes a satellite link, or another type of data communication network. The network 250 may include a physical and/or logical architecture defined by firewalls, proxy servers, routers, switches, or similar features that implement various levels of security and my function as logical gateways or boundaries.

In different embodiments, the assistance system 240 is configured to communicate with each AV of autonomous vehicles 206, as well as transmit commands to each AV and cause the AV to perform various operations. The assistance system 240 receives data from the onboard computing device of each of its fleet's vehicles (autonomous vehicles 1406) at telemetry processor 244 as well as any vehicle requests that may be generated at the AV (e.g., request for charging session, request for towing, request for security back-up, request for information, etc.), and maintains an ongoing evaluation of each vehicle via vehicle conditions monitor 242. In some embodiments, the message content from a vehicle and/or onboard sensor data for the vehicle indicates an urgent or otherwise impaired condition (e.g., sensor data values for some onboard component falling below or exceeding pre-selected thresholds, data that mechanical problems are occurring or have occurred, data that there is danger or some external risk to the AV). In such cases, the assistance system 240 can access the vehicle fleet database 270 to determine if there are any autonomous vehicles 206 in the vicinity of the impaired or requesting AV that can be sent to help. For purposes of this application, the target AV for which assistance is desired or about which information will be collected will be referred to as the primary AV, and the one or more AVs that are dispatched to assist/collect data about the primary AV will be referred to as secondary AVs.

Each vehicle in the fleet of autonomous vehicles 206 can be understood to include an onboard computing and vehicle control system. For example, the vehicle control system may include a communication component, a processor, a memory, a storage, input/output (I/O) ports, a display, and the like. The communication component may be a wireless or wired communication component that may facilitate communication between the vehicle control system, the sensors, any data services, image devices, and the remote assistance system 240 and cashflow exchange system 260.

The processor may be any suitable type of computer processor or microprocessor capable of executing computer-executable code. The processor may also include multiple processors that may perform the operations described below. The memory and the storage may be any suitable articles of manufacture that can serve as media to store processor-executable code, data, or the like. These articles of manufacture may represent computer-readable media (e.g., any suitable form of memory or storage) that may store the processor-executable code used by the processor to perform the presently disclosed techniques. The memory and the storage may also be used to store the data, various other software applications, and the like. The memory and the storage may represent non-transitory computer-readable media (e.g., any suitable form of memory or storage). It should be noted that non-transitory merely indicates that the media is tangible and not a signal. The I/O ports may be interfaces that may couple to other peripheral components such as input devices (e.g., keyboard, mouse), sensors, input/output (I/O) modules, and the like. It should be noted that the components described above with regard to the vehicle control system are exemplary components and the vehicle control system may include additional or fewer components as shown.

In some embodiments, the vehicle control system includes a sensor management engine that controls onboard sensors. This control may include determining which sensor of a plurality of sensors are gathering data/information, the operating characteristics of said data gathering (e.g., the level of zoom of a visible light camera), where sensor is aimed, or any other sensor performance control variables. It is contemplated herein that sensor may include a visible light camera, an infrared camera, a microphone, a particle inspection device (e.g., a device that can detect what compounds are in sampled air gathered by the AV), radar emitting/detecting device(s), a spectrometer, a hyperspectral sensor, a temperature sensor, a humidity sensor, a gas sensor, or a navigation sensor, among other things. In some embodiments, the sensors may include a device capable of detecting location, vibration, touch, temperature, sound, speed, motion, light, and the like. In one embodiment, the sensors may provide location information regarding the vehicle, as discussed above with respect to FIG. 1. As such, the sensors may provide global positioning system (GPS) coordinates and the like to indicate a location of the vehicle.

Thus, in different embodiments, each onboard vehicle control system may receive data from various data sources regarding the operation of the vehicle, one or more behavioral characteristics of the vehicle, certain traffic condition, road condition, and weather conditions of an area in which the vehicle is located, and the like. The various data sources may include sensors, data services, one or more image devices, a mobile computing system, and the like. Generally, the data received from the various data sources may assist the vehicle control system to determine whether a risk of damage to a vehicle (or another vehicle), to some property accessible by the vehicle, or to a driver of another vehicle exceeds a threshold. Such data can be used by the assistance system when assessing the AV's need for assistance. In some embodiments, upon receiving the data from the AV, the assistance system 240 may compare the data to normal/standard operating parameter values regarding the operation of the vehicle. If the data from the sensors do not substantially match the normal data, the assistance system 240 may control the operation of the vehicle or dispatch helper (secondary) vehicles to help the primary vehicle.

A vehicle selection module 246 includes a selection algorithm that is configured to determine which vehicle(s) in the fleet is best suited and located to render assistance. For example, the assistance system 240 can implement a software system for selecting an autonomously driven vehicle from the fleet of vehicles based on the availability of the vehicle, and the proximity of the vehicle to the target vehicle's location. Other parameters can be taken into account when selecting a fleet vehicle. Once selected, the assistance system 240 can generate a command signal via a vehicle dispatch module ("controller") 248 directly to the selected AV (autonomous vehicles 1406) or through the vehicle manager 234.

Thus, in addition to a request made by the primary AV, several other sources of information may be considered when executing the dispatch process. For example, in some embodiments, a dispatch protocol may be used to determine how the vehicles of the fleet are to be dispatched in response to requests for assistance. In different embodiments, the dispatch protocol may designate which types of autonomous vehicles are to be dispatched for given service requests. The dispatch protocol is the set of rules that are used to determine how, when, and where vehicles of the fleet are to be dispatched, based on the information available from various sources, including the expected trip distance, average speed, terrain of the route, and/or local rules and regulations restricting vehicular travel, etc., the service provided (e.g., the type of service, the duration of the service visit, whether an assistant service provider is on board as a passenger, the amount of fuel/charge to be used for the trip, what type of payload is involved, etc.). Further, the computer readable medium of the system may include instructions for considering vehicle data, such as vehicle condition/status (e.g., fuel level/battery charge, cash balance on board the vehicle, present location of the vehicle at the time of dispatch, etc.), and fleet status (e.g., the number of vehicles of the type requested that are available, the geographical distribution of the vehicles, the number of service requests pending, etc.). Some or all of these factors can be used by the assistance system 240 to determine a dispatch scheme of the fleet.

In some embodiments, the controller 248 may include networking hardware configured to interface with other nodes of a network, such as a LAN, WLAN, or other networks. For example, controller 248 may include a receiver and a transmitter. It will be appreciated that, in some embodiments, the receiver and transmitter may be combined in a transceiver. The receiver and transmitter may be configured to provide communication with other nodes/components/systems of the environment. For example, receiver and transmitter may be configured to communicate with vehicles of its associated fleet (autonomous vehicles 206). Such communication may be executed via any suitable format, such as satellite communication, radiofrequency signals, etc. A controller may be provided at any suitable location. In some cases, controller may be provided at a headquarters of a service provider. In other cases, controller may be provided at a dedicated dispatch facility configured to coordinate the fleet management processes.

Computer readable medium of controller 248 may include instructions for receiving a request for one or more roadside services. For example, controller 248 may be configured to receive requests from one of its AVs in the fleet. Computer readable medium of controller 248 may further include instructions for dispatching, to a location designated by the primary AV, a secondary AV configured to provide one or more services to the primary AV. Further, computer readable medium may include instructions to dispatch a fleet of vehicles in response to a specific type of request. For example, the fleet may include a plurality of autonomous vehicles, including a first vehicle, a second vehicle, and a third vehicle. In some embodiments, these vehicles may have different equipment, configured to provide different services to users. Accordingly, assistance system 240 may be configured to dispatch different vehicles depending on what type of service is being requested or has otherwise been determined to be required based on received sensor data. Accordingly, a first vehicle may include a first set of equipment configured to provide a first service to a primary vehicle, and a second vehicle may include a second set of equipment configured to provide a different, second service to a primary vehicle.

In some embodiments, the autonomous vehicles of the fleet may communicate with each other. In some cases, the range from which controller 248 may reach a vehicle may be extended by using a closer, or otherwise more accessible, vehicle as a relay. In other cases, vehicles may utilize artificial intelligence and/or machine learning to make adjustments to dispatch protocols and instructions. This may improve efficiency and/or response time. For example, upon receiving instructions, a first vehicle may evaluate whether it has enough fuel to complete the instructed trip. If not, the vehicle may pass along the instruction to another vehicle in the field. In some cases, the vehicles may broadcast a single signal that may be received by all vehicles in the fleet, and a suitable vehicle may accept the instructions passed along by the first vehicle. In other cases, the first vehicle may identify the vehicle that is closest to itself, the designated location of service, and/or the vehicle that otherwise best suited to make the requested trip and provide the requested service. The first vehicle may send a signal only to the identified vehicle, passing along the service instructions. Communication between vehicles of the fleet significantly broadens the capabilities of the fleet as a whole and provides a great amount of flexibility and efficiency in terms of the collective ability of the fleet to provide service to a large number of users.

The information necessary to navigate to the primary AV and any information regarding the type(s) of assistance required (e.g., towing, mechanical, tire, battery/power, accident, security threat, payload transfer, etc.) can also be transmitted to the selected secondary AVs via the assistance system 240 and route and schedule generation module 262. In some embodiments, the assistance system 240 maintains a substantially continuous tracking of the primary and secondary AVs to ensure the requested assistance is rendered and successfully completed. Either or both of the primary AV or the secondary AV can be configured to transmit updates to the assistance system 240 that confirm the execution of any commands deployed by the assistance system 240.

In some embodiments, the assistance system 240 may include or have access to electronic news sources that may be updated in real time or near real time via a network (e.g., Internet). The electronic news sources may provide information regarding weather alerts, natural disaster alerts, non-natural disaster alerts (e.g., traffic, active shooter), and any other information that may be published via an electronic news outlet such as a webpage, news database, or the like. The data services may also provide information related to road conditions (e.g., ice, snow) of the roads being driven on by the vehicle that can affect the kind of AV that will be selected by the vehicle selection module 246 (e.g., snowy or slippery conditions may cause the assistance system 240 to select an AV with corresponding capabilities). Road condition information may also include information regarding whether construction is present along a traveled path or route, whether traffic signs, traffic lane lines, traffic reflectors, and the like are visible and detectable by a certain threshold (e.g., percentage) of drivers, and the like. Additional data regarding the road conditions may include a determination as to whether the driven path differs or deviates from information provided via the data services. This and other local information can be used to help optimize the route taken by the secondary vehicles to the location of the primary vehicle.

In different embodiments, some of the steps described herein may be performed by a remote cloud-based server (e.g., cashflow system 260, assistance system 240), and some of the steps may be performed at hubs 204 and/or autonomous vehicles 206. As a general matter, some or all of the described functionality can be implemented in software and/or hardware, for example at computing devices incorporated into the hubs 204 and autonomous vehicles 206. Furthermore, the computing devices can include client software. The client software provides functionality to the device that provides for the implementation and execution of the features described herein. The client software can be implemented in various forms, for example, it can be in the form of a native application, web page, widget, and/or Java, JavaScript, .Net, Silverlight, Flash, and/or other applet or plug-in that is downloaded to the device and runs in conjunction with the web browser. The client software and the web browser can be part of a single client-server interface; for example, the client software can be implemented as a plug-in to the web browser or to another framework or operating system. Other suitable client software architecture, including but not limited to widget frameworks and applet technology can also be employed with the client software.

The embodiment of FIG. 2 depicts environment 200 in which the assistance system 240 can interact with other components of environment 200 in order to receive telemetry and other sensor data or messaging, as well as transmit commands and data. In some embodiments, the assistance system 240 can communicate with a canister and hub database 220, which stores information about all hubs registered with the central system, data that allows a scheduling module (not shown in FIG. 2) to maintain an up-to-date record of hub appointments and locations, which can be used to automatically identify the optimal schedule or hub-sequence for the autonomous vehicles to apply. The final route, based on data provided by the scheduling module, canister and hubs database 220, and vehicle fleet database 270, is designed to optimize the travel time and distance between each stop, and is produced by a route and schedule generation module 262 and sent to the autonomous vehicles 206 for implementation.

In some embodiments, a canister and hubs database 1420 receives and stores information about each canister in its network periodically to check its status and current contents via a canister status module 222, as well as determining whether the status of each canister is what is expected based on a cashflow monitor module 224, which maintains an accounting of the inventory of cash as it moves between one location and another.

In some embodiments, the vehicle fleet database 270 maintains an up-to-date record of each autonomous vehicle, as well as its current and past cash inventory, via an inventory monitor 272. In addition, in some embodiments, the vehicle fleet database 270 is configured to continuously track and record the movements and location of each vehicle via a vehicle location tracker module 274. Furthermore, the vehicle fleet database 270 can be configured to assign vehicles to perform specific cashflow exchanges, and confirm whether scheduled exchanges have occurred as expected via a vehicle manager 234. For purposes of security and accuracy, each of these components is in continuous communication with each vehicle in the fleet.

In different embodiments, the generation of a route and schedule can also trigger a verification module 210 of the exchange system 260 generate a unique verification code, for example via an encryption key generator 212, that will be transmitted to the vehicle that is deployed to allow a secondary AV to securely access and perform operations in conjunction with primary AVs. For example, upon arrival at a target location, the secondary AV can offer the encrypted key to the primary AV, and the primary AV can request verification via the verification module 212 before permitting the secondary AV vehicle access to any of its onboard systems or data.

In different embodiments, when (or after) an appointment is scheduled, the verification module 210 can generate an encryption key, QR or bar code, or other verification token. It should be understood that various types of verification tokens can be generated and/or requested by the system. In cases where the system requires the implementation of an encryption key, the encryption key generator 212 can generate the key that is delivered to the vehicle as a first token for presentation or transmission at the time of the visit to the target hub. In other embodiments, the system can implement security using a QR or bar code, or some other random and unique code. Because the appointment data 238 describes the date and time of the appointment, the system will also use this information to confirm whether the vehicle is 'expected'.

In some optional embodiments, upon the arrival of the secondary vehicle, onboard sensor devices can be triggered to capture data of the primary vehicle and/or surrounding environment. This data can be used to further secure the vehicular interaction process and maintain an independent record of the exchange events. For example, a camera or other device for capturing images and other light-based data can be installed. The camera may comprise any kind of camera, including any kind of digital camera, as well as a camera configured to capture infrared, x-ray, ultraviolet, and visible light signals. In another example, the vehicle can emit a signal via an onboard signal emitter such as a radio emitter, speaker, NFC-components, or other output component. In one example, the identification signal can comprise a specific image or sound. The signal can be received by the local device, such as by a camera or another input component (e.g., microphone, radio receiver, NFC components, etc.), which can be transmitted to the assistance system 240 over network 250.

Each computing device and system shown in FIG. 2 may include one or more processors and memory. Memory may comprise a non-transitory computer readable medium. Instructions stored within memory may be executed by the one or more processors. In addition, each device may include a communication system such as a radio or other provisions for communicating using one or more communication methods. In particular, communication system includes provisions for communicating with other nearby devices and/or cloud server over a network. For example, each communication system could include a Wi-Fi radio, a Bluetooth radio, other NFC components, and/or a cellular network radio. Each local computing device can include provisions for communicating with, and processing information from, a cloud-based server as well as other devices in a home network.

Figure 3:
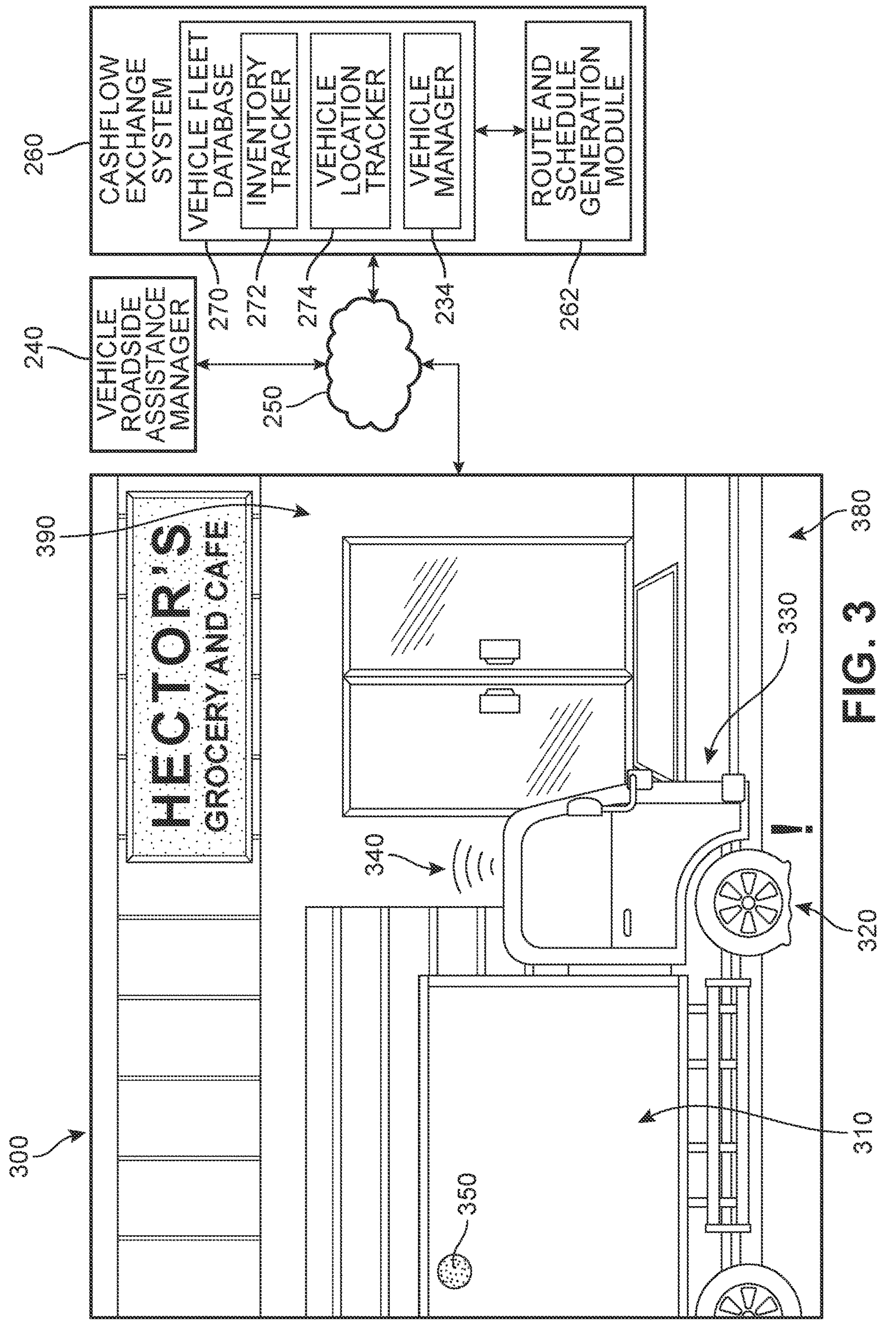
FIGS. 3 and 4 depict one example of a scenario whereby roadside towing assistance is autonomously rendered by one AV to another AV, according to an embodiment.
Figure 4:
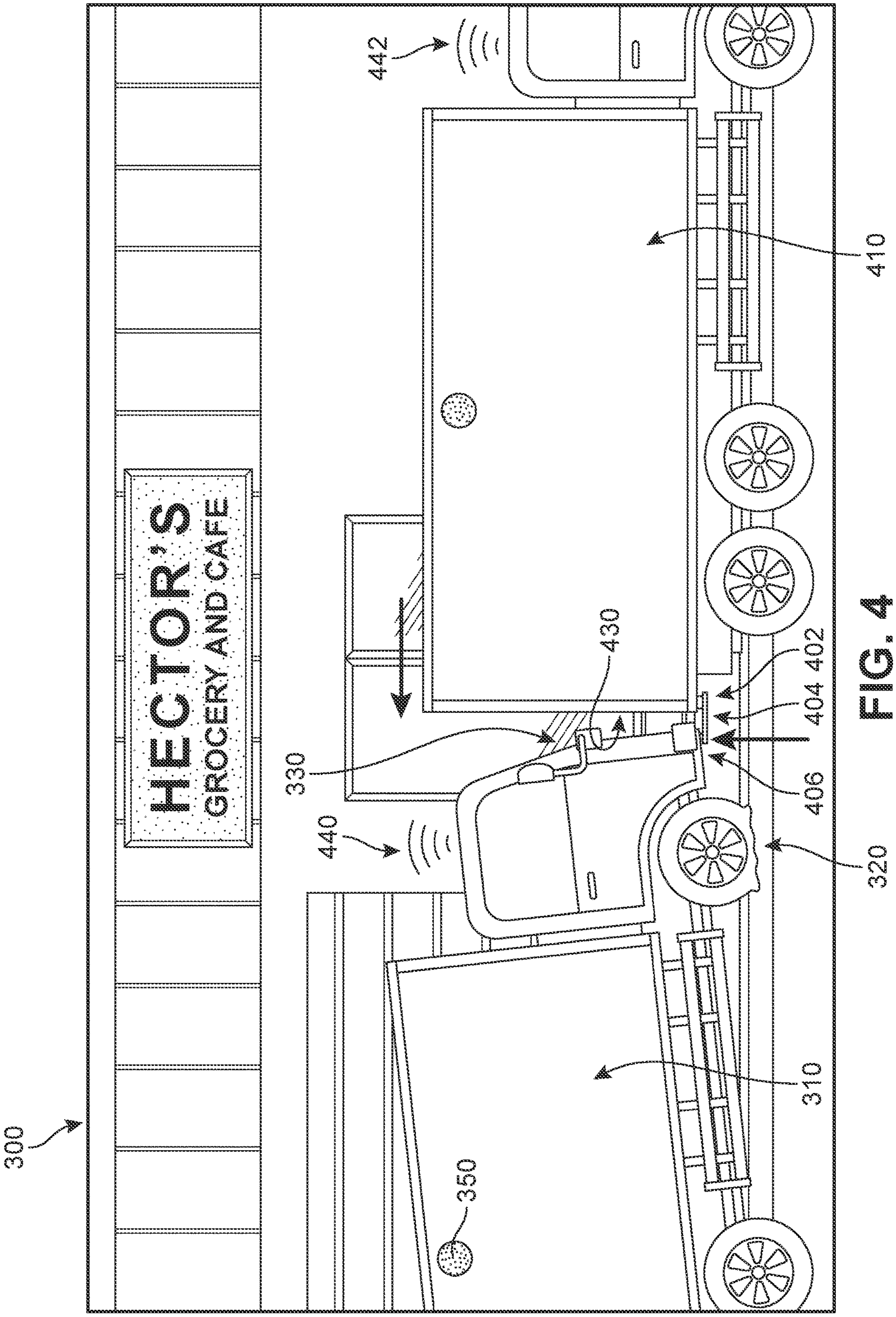

For purposes of illustration, some example scenarios in which the proposed assistance system may be implemented are presented with reference to FIGS. 3-10. In FIGS. 3 and 4, a first scenario 300 involving a primary AV 310 is depicted. The primary AV 310 is shown at a first location 390, stopped on the side of a road 380 near a first merchant where a canister hub may be installed, as described in the Cash Balancing application. An access hatch 350 is formed along the exterior, configured to receive and deploy canisters. During its travels, a front tire 320 has been punctured, resulting in a flat tire toward a forward end 330 of the primary AV 310. The vehicle control system for primary AV 310 transmits sensor data describing the flat tire and/or a request-for-towing message 340 to the remote assistance system 240 over network 250. In response, as described with respect to FIG. 2, the assistance system 240 identifies an available and appropriate secondary vehicle and dispatches the selected vehicle to aid the primary AV 310.

This process is depicted in FIG. 4, where a secondary AV 410 has received control instructions from the assistance system indicating its target destination (first location 390) and its mission (tow the primary AV back to the nearest AV fleet storage or repair center). In response, the secondary AV 410 travels from its original location (i.e., a second location in the vicinity of the first location) and autonomously navigates into towing position. For this example, towing gear 402 is mounted on a rear end 430 of the secondary AV 410, so the secondary AV 410 reverse-approaches the primary AV 310 until in range of the hitch or tow hook 406 on the front bumper of the car body, forming a secure towing connection/link between its towing gear 402 (such as a tow yoke). Throughout this operation, each vehicle can be configured to transmit updates to the assistance system; for example, once the secondary AV 410 arrived, it could transmit a first confirmation signal 442 indicating one or more of (a) a successful arrival at the first location and an identification of the primary AV 310, (b) a successful towing link having been formed with the primary AV 310, and/or (c) that the towing process has begun and both vehicles are now on the move. Similarly, the primary AV 310 could transmit a second confirmation signal 440 indicating one or more of (a) a successful arrival of the secondary AV 410 at the first location, (b) a successful towing link having been formed with the secondary AV 410, and/or (c) that the towing process has begun and both vehicles are now on the move. In some embodiments, the primary AV 310 may only permit the mating between the tow hook 406 (which may otherwise be blocked or hidden in a compartment) if the secondary AV 410 transmits the correct verification code.

Referring next to FIGS. 5A-5D, a second scenario 500 is depicted in which a first AV 510 (the secondary AV in this case) has arrived at a second location 530 in response to a request or other sensor data from a second AV 520 (the primary AV in this case) received by the assistance system. However, in this scenario, rather than dispatching a vehicle to perform a towing operation, the assistance system determines there is a more immediate need for protecting the assets held as payload in the second AV 520. Thus, the first AV 510 has been dispatched with instructions to transfer the payload from the cargo trailer of the second AV 520 to the cargo trailer of the first AV 510. As shown in the first time T1 of FIG. 5A, the first AV 510 has pulled up and is directly adjacent and parallel to the second AV 520, such that a first access hatch 512 formed on an exterior of the first AV 510 is directly aligned with and only slightly spaced apart from a second access hatch 522 formed on an exterior of the second AV 520.

Figure 5A:
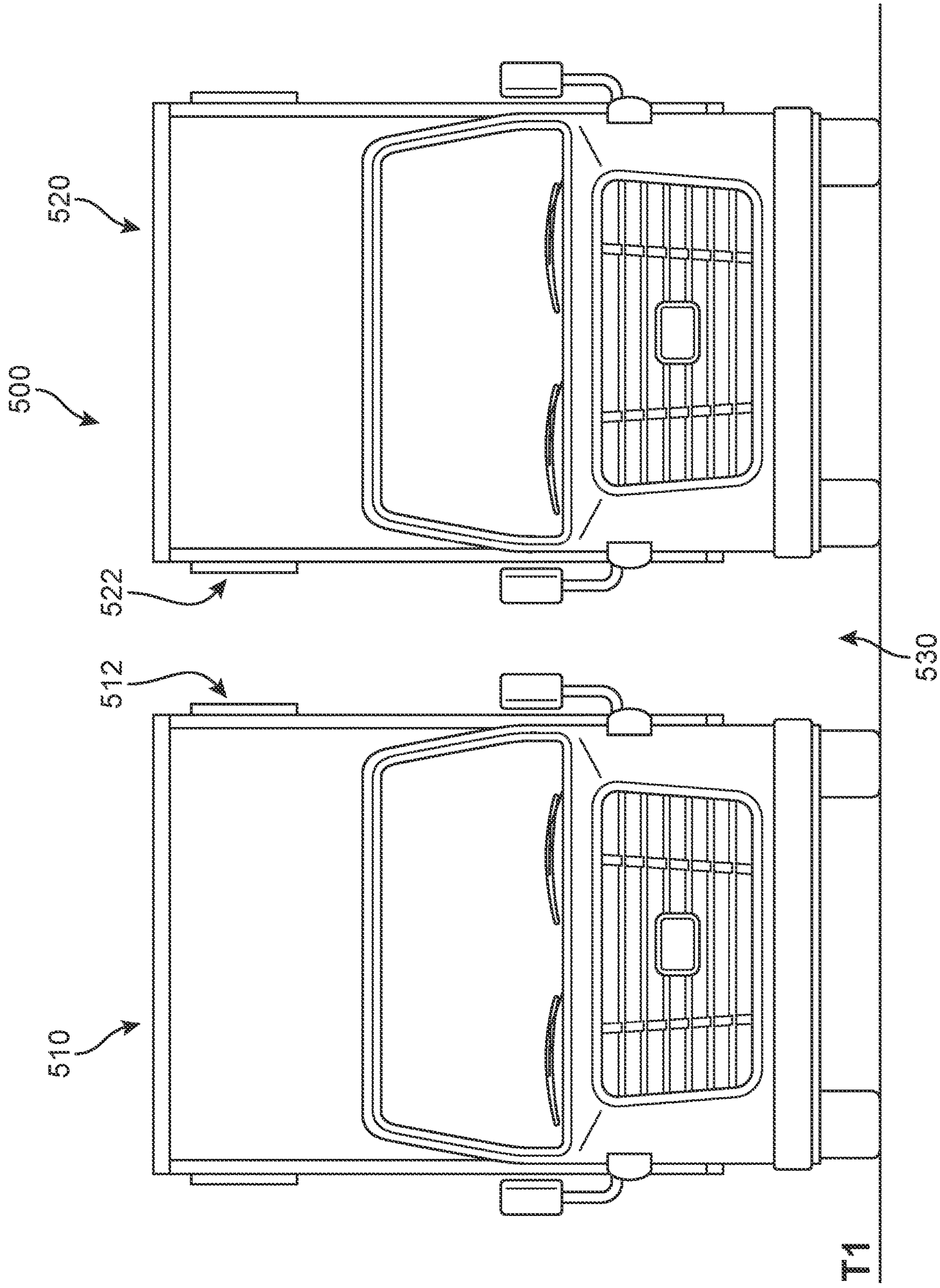
FIGS. 5A-5D depict one example of a scenario in which a payload is transferred autonomously from one AV to a second AV, according to an embodiment.
Figure 5B:
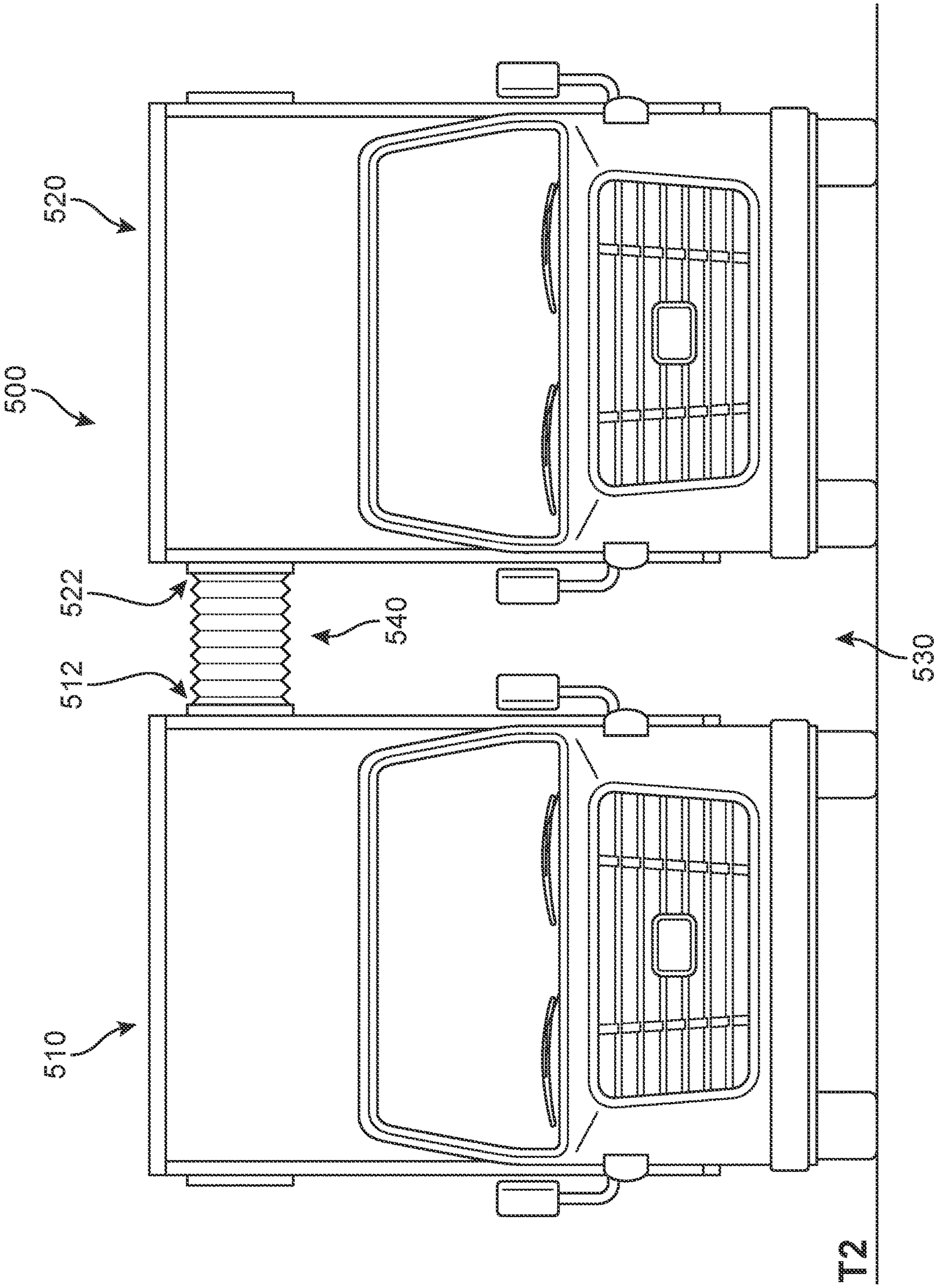
Figure 5C:
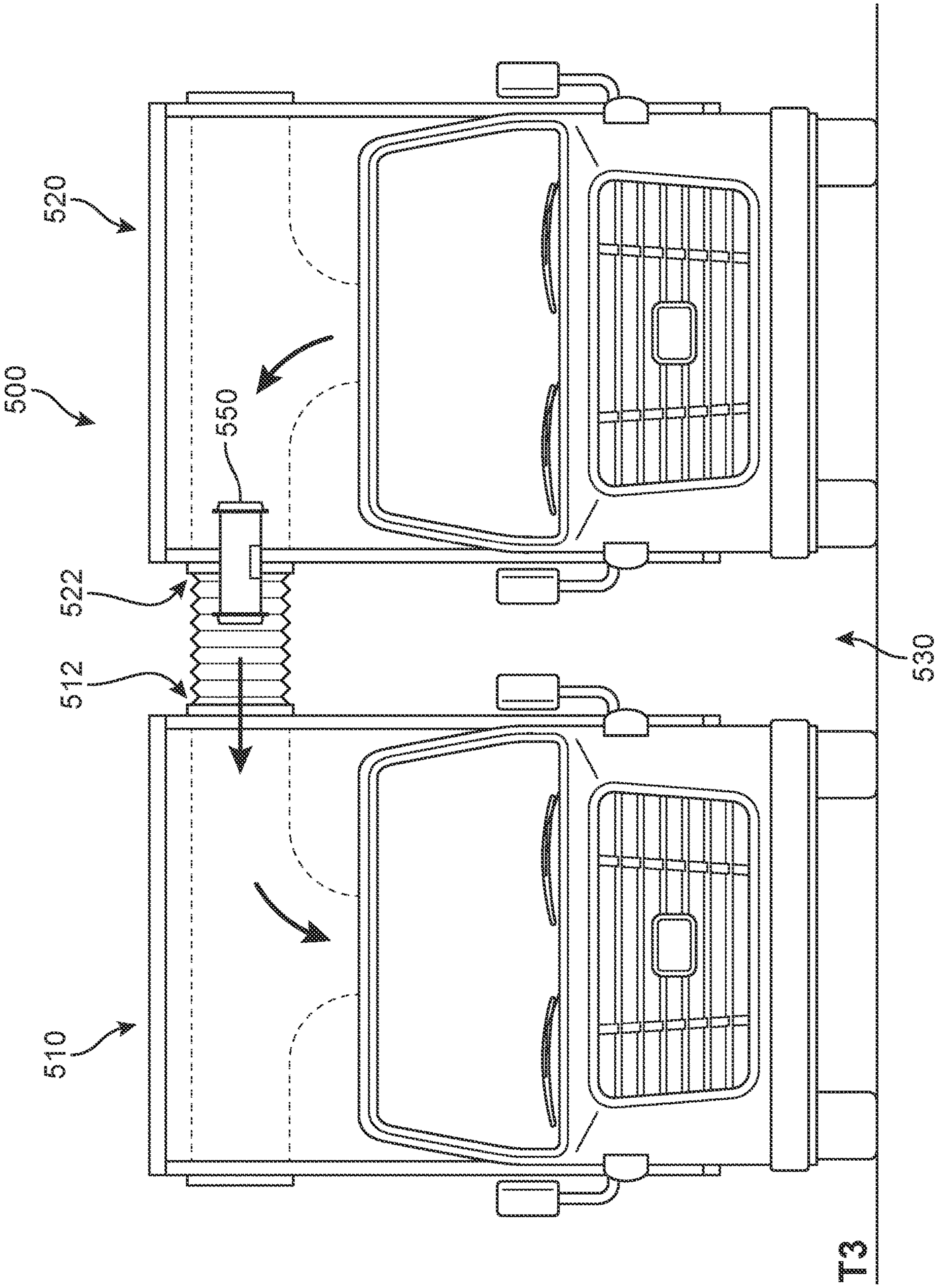
Figure 5D:
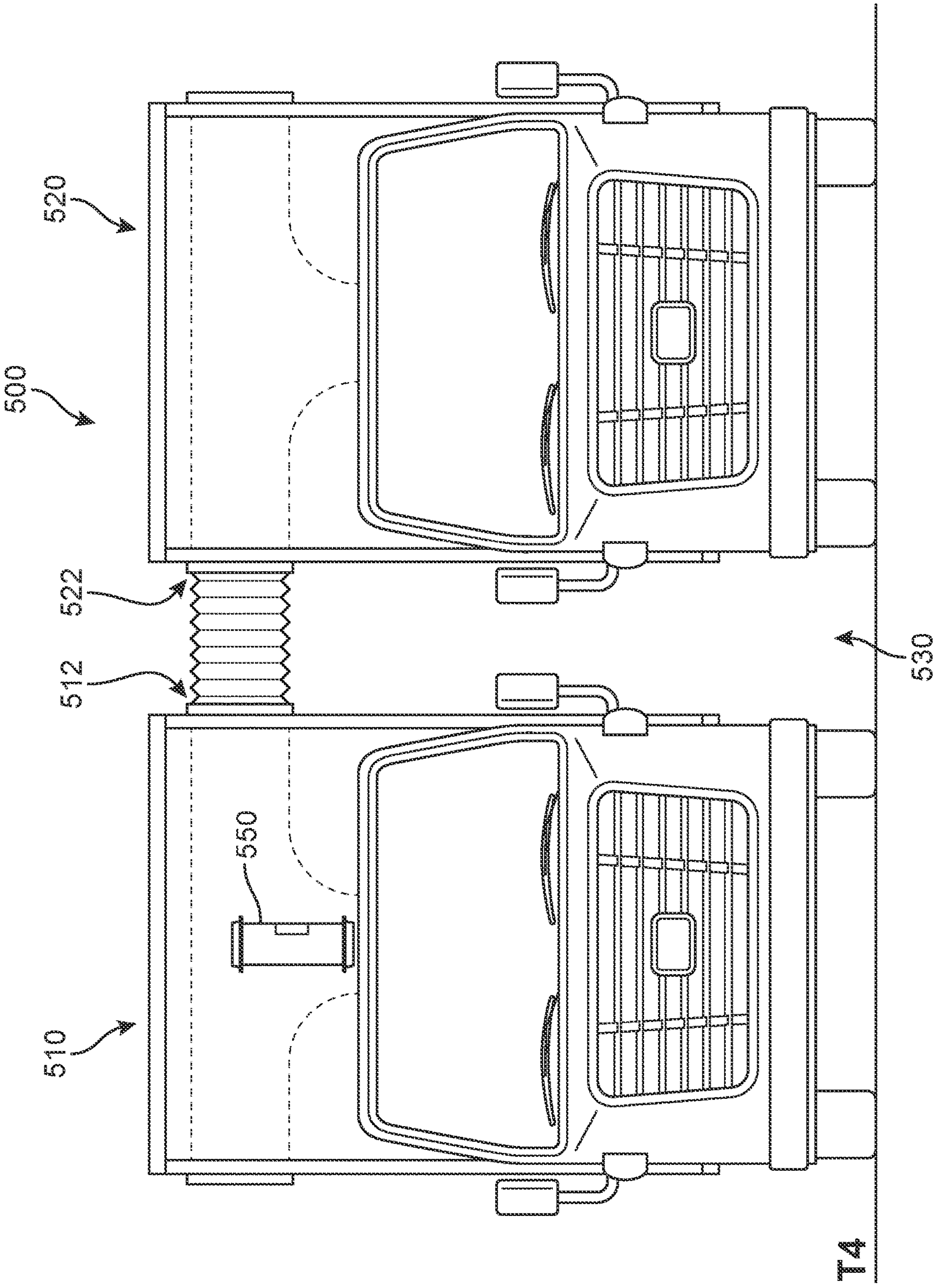

In a subsequent second time T2 shown in FIG. 5B, both hatches (512, 522) have been opened, and one of the vehicles extends a mating tube 540 that extends the full distance between the two vehicle sides and provides a secure passage of fluid communication between the interior space of each of the cargo holds of the two vehicles. In one example, the mating tube 540 is configured to work in conjunction with one or both of the pneumatic tube systems provided in the cargo of each vehicle. Moving to FIG. 5C, at a subsequent third time T3, a canister 550 is shown as it is deployed or travels with pneumatic pressure from a first pneumatic storage system 524 in second AV 520 to a second pneumatic storage system 514 in first AV 510 via tube 540. Thus, as shown in FIG. 5D, at a subsequent fourth time T4, the canister—for purposes of this example, containing $1040 cash—has arrived at the first AV 510, bringing the total payload of the first AV 510 from $280 to $1320, and the total payload of the second AV 520 down to zero. In some embodiments, the first AV 510 may even incorporate the stops and canister exchanges that had been scheduled for the second AV 520, as the payload has been updated to incorporate the payload of the vehicle that had been disabled. In this example, it can be appreciated that the transmission of and receipt of a verification signal between the AVs can also be implemented to ensure the transfer occurs with an AV authorized to take on the payload As discussed herein, an AV may be used to assist with security of other AVs in the fleet. In addition, in some embodiments, an AV may gather information about the scene of an accident, or collect other evidence that may be pertinent to the security and/or monitoring of the fleet vehicles. The information may be obtained from sensors located on the AV (e.g., video camera, photo camera, infrared camera, motion detectors, etc.), or the like. In different embodiments, AVs can be dispatched to drive around an area near a primary AV and along nearby roads, and include digital displays on the sides or back/front of the vehicle that are configured to provide nearby vehicles about the disabled primary AV and direct traffic autonomous vehicles to switch over to another lane, avoid an accident area, or assist in the directing of traffic via displays on the autonomous vehicle. There may be multiple different visual alerts such as: a graphic or text displayed on a screen attached with AV or a light or flashing light (e.g., strobe, rotating, vehicle signal or emergency lights) attached or communicatively connected with the AV. In an example scenario, after a primary AV is disabled or involved in an accident, a secondary AV may travel 50 yards along a road and flash an arrow indicating to drivers to move over to the other lane. The flashing arrow or other graphic or text may be placed on a retractable surface of the secondary AV.

In some embodiments, the secondary AV is dispatched to collect data about the environment around the primary vehicle. In different embodiments, the vehicle's onboard computing system can include one or more image signal processing algorithms and/or software (e.g., image processing module); in other embodiments, such techniques may be applied to raw data provided by remote server or on the local device. In some embodiments, pre-processing and processing of the captured image data (e.g., collected by the one or more image sensors) can be performed by the onboard computing system. For example, the image input can be cleansed and normalized by the image processing module. In different embodiments, various image processing algorithms and/or software may be used with captured image data. In one embodiment, the image processing algorithms perform compression, artifact correction, noise reduction, color corrections, geometric corrections, imager non-uniformity correction, etc., and various image processing enhancement operations on the image content. The algorithms can be implemented as software running on a processor, DSP processor, special purpose ASIC and/or FGPA's. The image processing algorithms can also be a mixture of custom developed algorithms and libraries. The image processing algorithms can further be arranged in any logical sequence, with potential changes in the sequence of processing or parameters governing the processing determined by image type, computational requirements or outputs from other algorithms.

In some embodiments, image processing may also include machine learning techniques that can be used to discriminate between features and to identify objects, for example via image recognition and object detection software. Such techniques may also include machine vision algorithms that perform, among other operations, symbol and logo recognition, general shape recognition, as well as object classification, in order to determine the identity of the objects around the primary AV. The machine vision algorithms may reside on a different system belonging to a different entity than the image processing algorithms or the application software. The machine vision algorithms, which are applied to identify an object in the digital image, may include computer vision algorithms such as image analysis algorithms that may use a feature detector or a combination of detectors. For example, texture detectors and edge detectors known to those skilled in the art may be used. If both specific texture and specific edges are detected in a set of images, then an identification may be made. One non-limiting example of an edge detection method includes the Canny™ algorithm available in computer vision libraries such as Intel™ OpenCV. Texture detectors may use known algorithms such as texture detection algorithms provided by Matlab™. Some non-limiting examples of object detection algorithms include R-CNN, SPP, Fast R-CNN, Faster R-CNN, Feature Pyramid networks, RetinaNet (Focal loss), Yolo Framework—Yolo1, Yolo2, Yolo3, and SSD.

In some embodiments, machine learning techniques, such as deep learning that includes classification, clustering, and/or other techniques, are trained to detect the specific patterns that may be presented or produced to represent the visual signal received, and are then captured in the image data. Such ML techniques may include, but are not limited to, techniques that employ deep learning neural networks for pattern recognition within the image data, or to perform other types of analysis. For example, a neural network and/or classification technique may be used to train a model that is a classifier and that is useable to detect different pattern types. Some suitable artificial intelligence software is available for public access through open-source AI systems like Caffe, Torch and Theano who provide businesses access to powerful neural networks for processing of their information by AI techniques like deep learning, reinforcement learning and logistic regression, as well as TensorFlow, OpenAI, and BigSur. In some embodiments, the image recognition module may, for example, apply a convolutional neural network. In another example, computer learning may be used to recognize image elements such as specific items (e.g., jewelry, papers, coins, medicines, capsules, bags, etc., as well as the presence of human persons in proximity to the canister. The image processing may use GPS data or other geolocation data. The computing device may recognize one or more positions or features in the image data, such as based on shapes, patterns, or colors of the image data.

Referring to FIGS. 6-10, a third scenario 600 is depicted by a top-down or bird's eye view of a section of a town comprising a plurality of city blocks including on a north side of main street 674 a first block 682, a second block 684, a third block 686, and a fourth block 688, and on the south side there is a fifth block 690, a sixth block 692, a seventh block 694, and an eighth block 696. Each of the blocks can be understood to represent the location of one or more residences, businesses, shops, or other buildings where a hub could potentially be installed.

Figure 6:
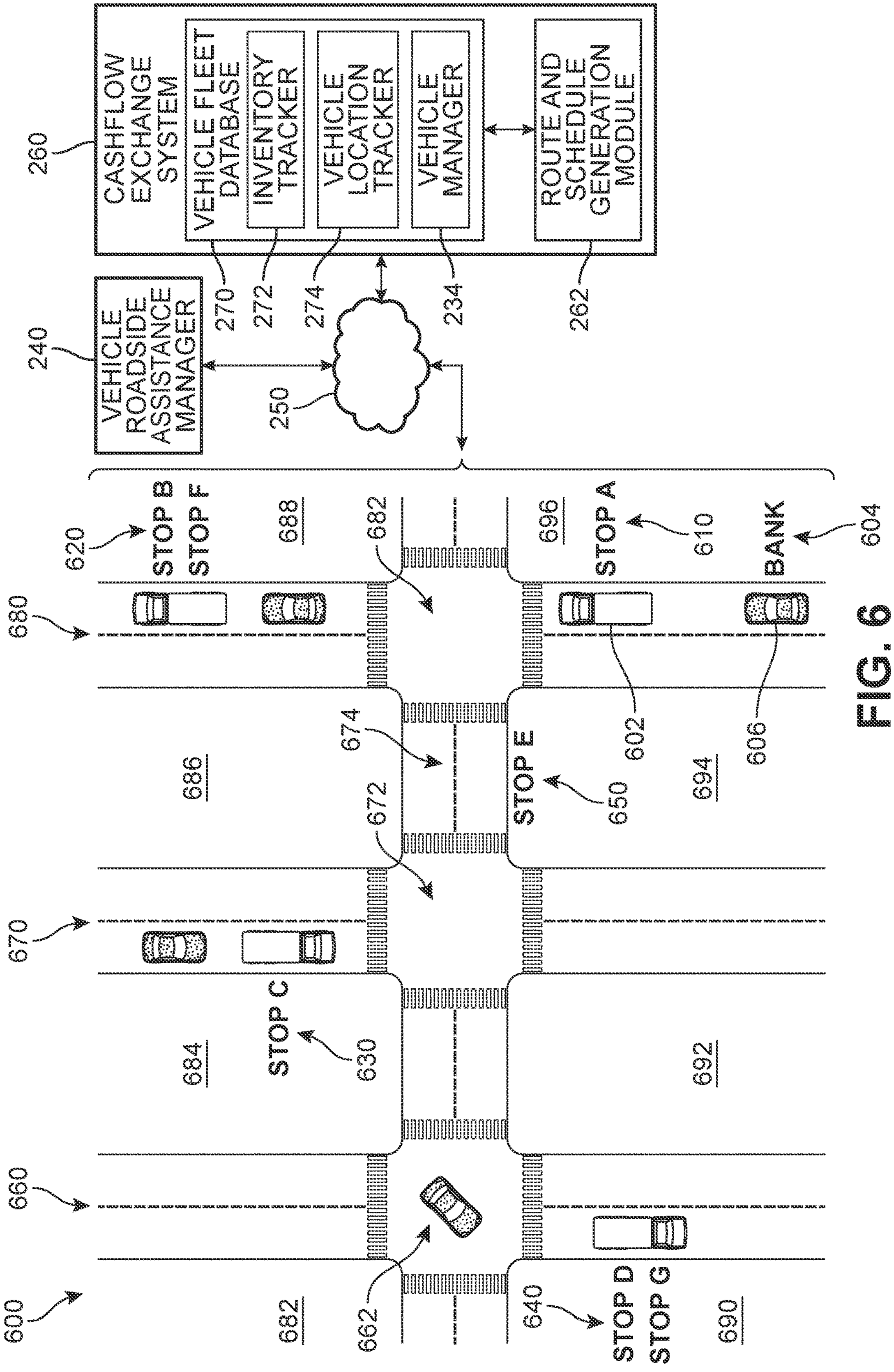
FIGS. 6-10 are a sequence depicting one example of a scenario in which an unauthorized vehicle poses a threat to an AV and other AVs are dispatched to provide security assistance, according to an embodiment.

In this example, introduced in FIG. 6, a scenario across multiple timepoints is represented. Initially, a primary AV 602 is shown beginning its route near a bank 604, where it may have received a full load of canisters, each including different denominations of cash. The inventory on the truck is automatically updated and its status is communicated to the central server. The primary AV 602 then moves along a first street 680 performing its pre-scheduled route from the bank 604 to a first exchange location 610 (stop A), where it can deliver or retrieve one or more canisters via the onsite hub per the instructions, preferences, or request data submitted by the user at that location. The inventory is automatically updated and its status is communicated to the central server. However, it can also be observed that following closely behind the primary AV 602 is an unauthorized vehicle 606. At this time, the sensors onboard primary AV 602 simply observe and record information about the general environment around the primary AV 602, and there is no recognition of a threat.

The primary AV 602 then crosses a first intersection 682 to arrive at a second exchange location 620 (stop B), where it can deliver or retrieve one or more canisters via the onsite hub. The unauthorized vehicle 606 continues to follow the primary AV 602. This process is repeated as it makes its way along a sequence of locations, including a third exchange location 630 (stop C) on the other side of the third block 686 on a second street 670, and a fourth exchange location 640 (stop D) after crossing a second intersection 672 and turning south on a third street 660 at a third intersection 662. During this sequence, the primary AV 602 may make an on-site or real-time assessment via its onboard computing system and determination that there is now a heightened risk where the AV may be exposed to some targeting or criminal activity, and/or it may send its sensor data to the assistance system 240 which can determine whether the recent activity should be classified or categorized as a particular threat to the AV.

Figure 7:
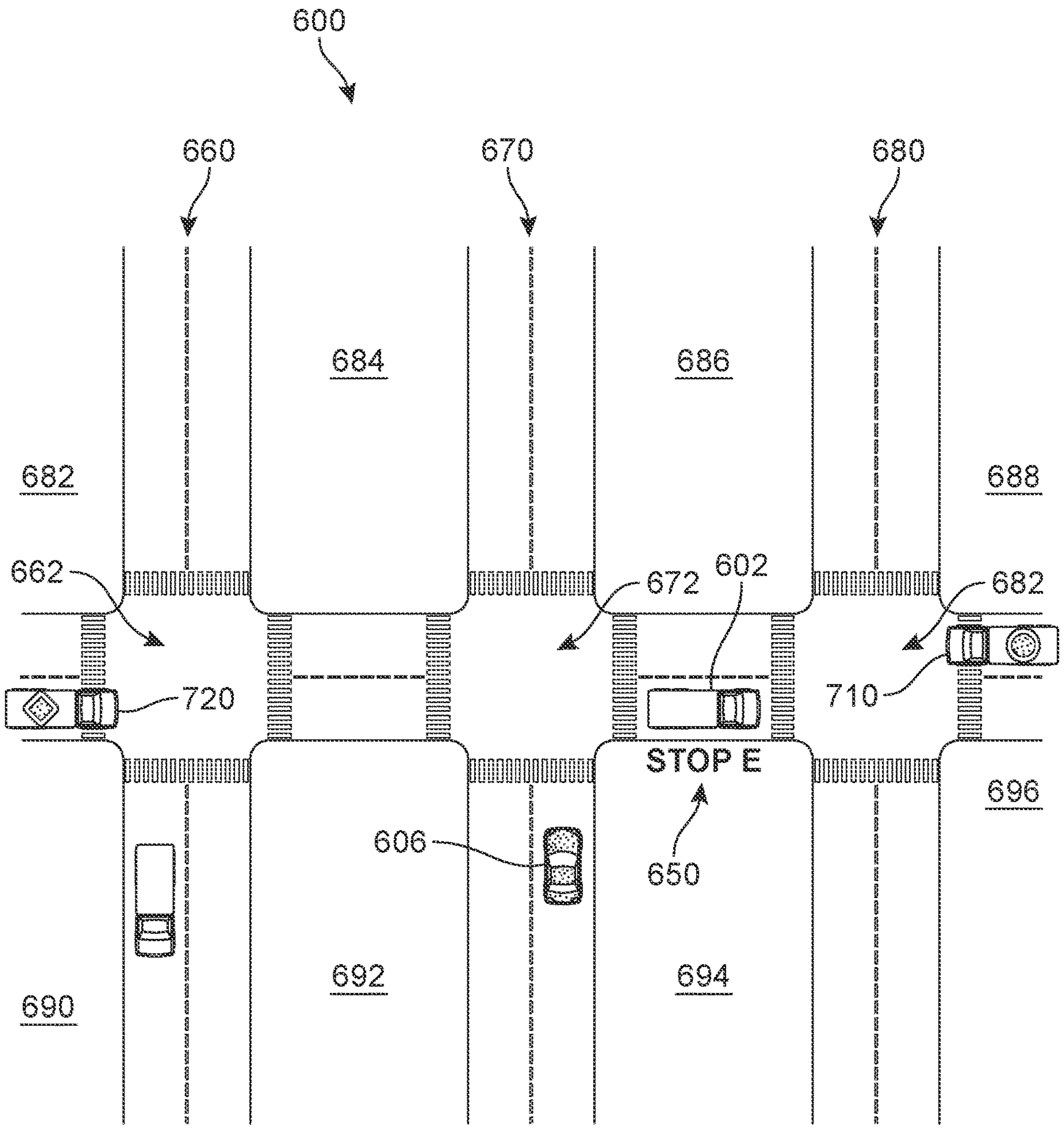

In response to this determination, the assistance system 240 can proceed with dispatching one or more secondary security vehicles that are in the vicinity of the primary AV 602. As shown in FIG. 7, as the primary AV 602 continues its travels, moving around the sixth block 692 to return and move north along the second street 670, where it makes a right turn at the second intersection 672 onto the main street 674 that allows the truck to arrive at a fifth exchange location (stop E), the unauthorized vehicle 606 is still close behind. However, a first security AV 710 (distinguished by a circular symbol in the drawing) has been dispatched and approaches now from the east side, and a second security AV 720 (distinguished by a square symbol in the drawing) has been dispatched and approaches from the west side. As soon as the security AV is near the primary AV, it may be configured to "lock on" to the primary AV and follow it. While following the primary AV, the security AV may take pictures and record other information such as identification features associated with the suspected person or the vehicle that was targeting the primary vehicle.

Figure 10:
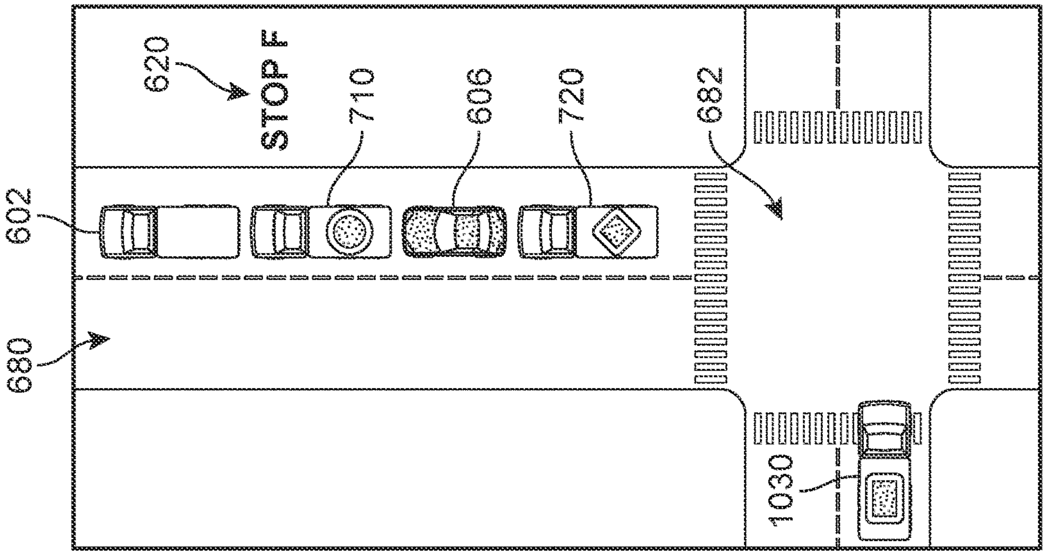
Figure 9:
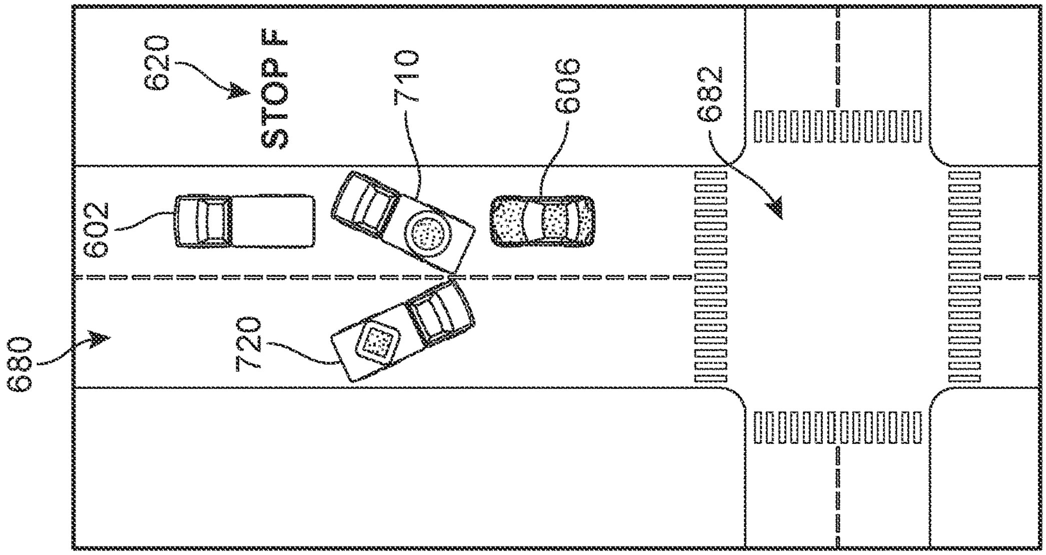
Figure 8:
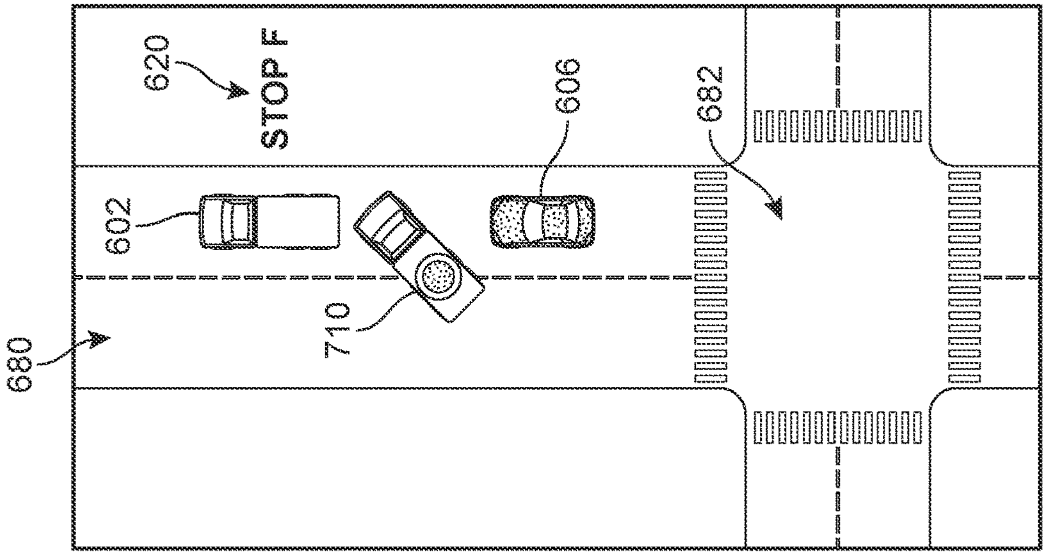

In FIG. 8, a zoomed-in view is shown in which the primary AV 602 is performing a follow-up exchange event at the second exchange location 620 (stop F). Before the unauthorized vehicle 606 can approach directly behind the primary AV 602, the first security AV 710 has moved around the unauthorized vehicle 606 and merged directly ahead to escort the primary AV 602, thereby blocking or forcing a buffer zone to be formed between the two vehicles. In FIG. 9, the second security AV 720 also arrives, and coordinates with the first security AV 710 to form a barrier to prevent the passage of traffic along the first street 680, thereby protecting the primary AV 602 from the identified threat. Alternatively, FIG. 10 illustrates an arrangement in which the first security AV 710 merges ahead of the unauthorized vehicle 606 while the second security AV 720 pulls directly behind, allowing each to closely monitor and capture data about the unauthorized vehicle 606.

Figure 11:
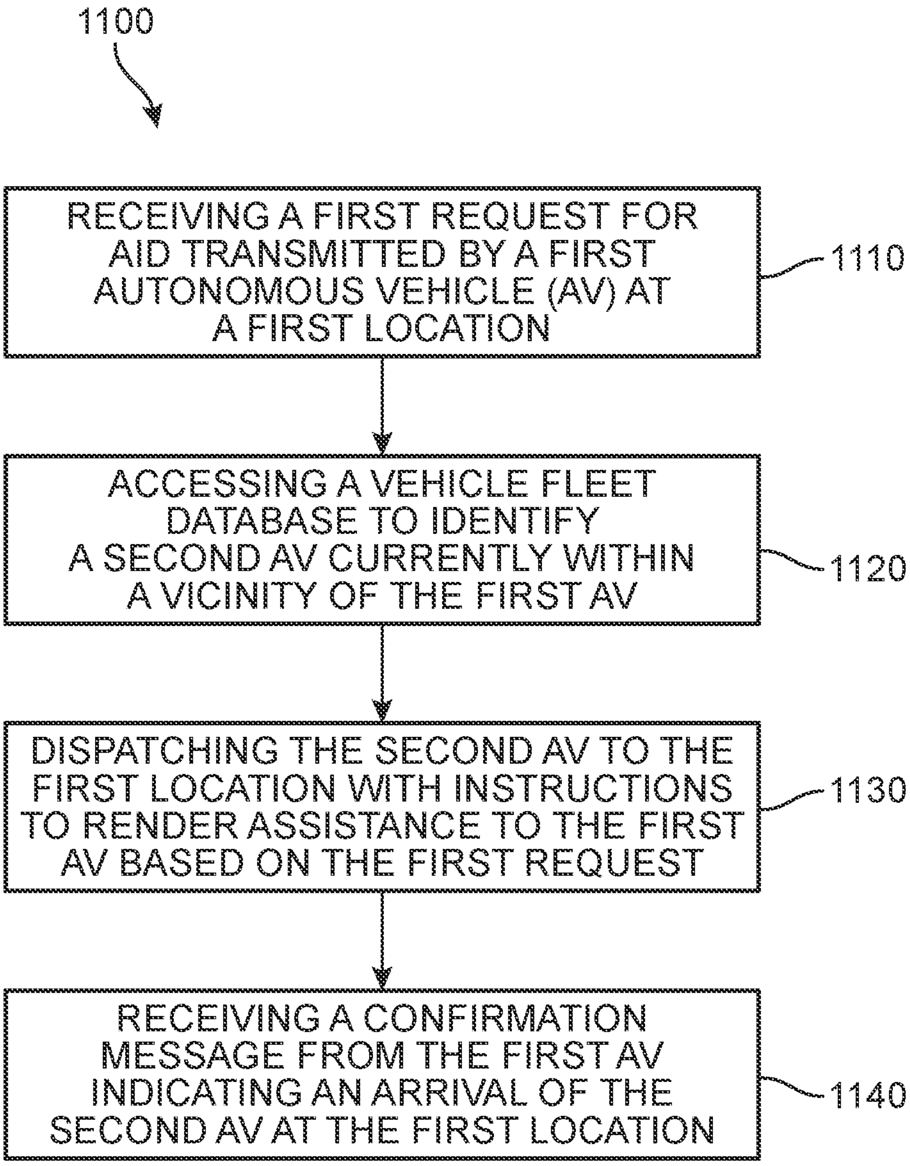
FIG. 11 is a flow chart depicting a method for remote monitoring of pneumatic canisters, according to an embodiment.

FIG. 11 is a flow chart illustrating an embodiment of a method 1100 of providing roadside assistance using a fleet of autonomous vehicles. The method 1100 includes a first step 1110 of receiving, at a vehicle assistance management system, a first request for aid transmitted by a first autonomous vehicle (AV) at a first location, and a second step 1120 of accessing, by the vehicle assistance management system, a vehicle fleet database to identify a second AV currently within a vicinity of the first AV. In addition, a third step 1130 includes dispatching, by the vehicle assistance management system, the second AV to the first location with instructions to render assistance to the first AV based on the first request, and a fourth step 1140 includes receiving, at the vehicle assistance management system, a confirmation message from the first AV indicating an arrival of the second AV at the first location.

In other embodiments, the method may include additional steps or aspects. In some examples, the first request is automatically generated by the first AV in response to first data collected by a first sensor onboard the first AV. In another example, the first sensor is one of a tire pressure gauge, a temperature sensor, and a battery capacity sensor. In some embodiments, the first request includes a description of first data, and the method further includes selecting, by the vehicle assistance management system, the second AV based on the first data.

In different embodiments, the method includes an additional step of transmitting, by the vehicle assistance management system, a command signal to the second AV to travel to the first location and perform one of a towing of the first AV and a power transfer to the first AV. In another embodiment, the method also includes steps of receiving, at the vehicle assistance management system and from the first AV, real-time feedback regarding a battery level of the first AV, and transmitting, by the vehicle assistance management system, a stop command when the feedback indicates sufficient power has been restored to the first AV.

In some embodiments, the first AV is stuck or otherwise temporarily disabled by a road condition such as a pothole, cracked road, gravel, sand, mud, or water. In such cases, the first AV can provide real-time feedback regarding its trouble or issue, such that the vehicle assistance management system transmits a command to the second AV to release the towing connection when the feedback indicates the first AV is no longer disabled (e.g., has been pulled out of the pothole or flood area).

In another example, the method also includes steps of receiving, at the vehicle assistance management system and from the second AV, real-time feedback regarding a towing operation of the first AV, and transmitting, by the vehicle assistance management system and to the first AV, a command to shift into neutral when the feedback indicates the tow hook of the first AV has been secured to a tow yoke of the second AV. In some embodiments, the first request indicates a potential security threat to the first AV is in progress, and the method further includes receiving, at the vehicle assistance management system and from the second AV, a record of the potential security threat captured by onboard cameras.

Other methods can also be contemplated within the scope of this disclosure. For example, a method of protecting one or more items carried by an autonomous vehicle includes a first step of receiving, at a vehicle assistance management system, a first request for aid transmitted by a first autonomous vehicle (AV) indicating a potential security threat by an unauthorized vehicle, and a second step of accessing, by the vehicle assistance management system, a vehicle fleet database to identify a second AV currently within a vicinity of the first AV. In addition, the method includes a third step of dispatching, by the vehicle assistance management system, the second AV to a first location with instructions to form a buffer zone directly around the first AV, and a fourth step of receiving, at the vehicle assistance management system, a confirmation message from the second AV indicating the second AV is physically disposed between the first AV and the unauthorized vehicle.

In other embodiments, the method may include additional steps or aspects. In one example, the method also includes steps of accessing, by the vehicle assistance management system, the vehicle fleet database to identify a third AV currently within a vicinity of the first AV, dispatching, by the vehicle assistance management system, the third AV to a current location of the first AV with instructions to obtain image data of the unauthorized vehicle, and receiving, at the vehicle assistance management system and from the third AV, first data corresponding to one or more images of the unauthorized vehicle. In another embodiment, the method further includes steps of accessing, by the vehicle assistance management system, the vehicle fleet database to identify a third AV currently within a vicinity of the first AV, dispatching, by the vehicle assistance management system, the third AV to a current location of the first AV with instructions to hinder the unauthorized vehicle from following the first AV, and receiving, at the vehicle assistance management system and from the third AV, a confirmation message whereby a first road is blocked by the third AV and preventing the unauthorized vehicle from following the first AV.

In one embodiment, the second AV escorts the first AV until the first AV has arrived at a location deemed safe by the vehicle assistance management system. In some embodiments, the method also includes steps of accessing, by the vehicle assistance management system, the vehicle fleet database to identify a third AV currently within a vicinity of the first AV, dispatching, by the vehicle assistance management system, the third AV to a current location of the first AV with instructions to transfer a first payload onboard the first AV to the second AV, and receiving, at the vehicle assistance management system and from the third AV, a confirmation message whereby a second payload of the third AV now includes the first payload. Also, as described herein, some of the proposed embodiments can be understood to include a fleet of one or more autonomous vehicles configured to perform the functions and operations described herein.

It is appreciated that methods in accordance with the present disclosure can include any combination of the aspects and features described herein. That is, methods and systems in accordance with the present disclosure are not limited to the combinations of aspects and features specifically described herein, but also include any combination of the aspects and features provided.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both. In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device (s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device (s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for providing roadside assistance using a fleet of autonomous vehicles, the method comprising:

receiving, at a vehicle assistance management system, a first request for aid transmitted by a first autonomous vehicle (AV) at a first location;

accessing, by the vehicle assistance management system, a vehicle fleet database to identify a second AV currently within a vicinity of the first AV;

dispatching, by the vehicle assistance management system, the second AV to the first location with instructions to render assistance to the first AV based on the first request;

receiving, at the vehicle assistance management system, a confirmation message from the first AV indicating an arrival of the second AV at the first location; and transmitting, by the vehicle assistance management system, a command signal to the second AV to travel to the first location and perform a power transfer to the first AV by forming an electrical connection between a first onboard battery of the first AV and a second onboard battery of the second AV and initiating a charging session that transfers power from the second onboard battery to the first onboard battery.

2. The method of claim 1, wherein the first request is automatically generated by the first AV in response to first data collected by a first sensor onboard the first AV.

3. The method of claim 2, wherein the first sensor is one of a tire pressure gauge, a temperature sensor, and a battery capacity sensor.

4. The method of claim 2, wherein the first request includes a description of first data, and the method further comprises selecting, by the vehicle assistance management system, the second AV based on the first data.

5. The method of claim 1, further comprising monitoring, at the vehicle assistance management system, conditions related to the first AV as provided by an onboard telematics device of the first AV including a remaining battery charge of the first AV, as well as a cash balance being transported onboard the first AV via its cashflow monitor module.

6. The method of claim 1, wherein the second AV performs the power transfer to the first AV, and the method further comprises:

receiving, at the vehicle assistance management system and from the first AV, real-time feedback regarding a battery level of the first AV; and transmitting, by the vehicle assistance management system, a stop command when the feedback indicates sufficient power has been restored to the first AV.

7. The method of claim 1, wherein the electrical connection is formed via a connection arm that protrudes out from the second AV and docks with a port formed on an exterior surface of the first AV.

8. The system of claim 1, wherein the wherein the electrical connection is formed via a connection arm that protrudes out from the second AV and docks with a port formed on an exterior surface of the first AV.

9. A system for roadside assistance using a fleet of autonomous vehicles, the system comprising a processor and machine-readable media including instructions which, when executed by the processor, cause the processor to:

receive, at a vehicle assistance management system, a first request for aid transmitted by a first autonomous vehicle (AV) at a first location;

access, by the vehicle assistance management system, a vehicle fleet database to identify a second AV currently within a vicinity of the first AV;

dispatch, by the vehicle assistance management system, the second AV to the first location with instructions to render assistance to the first AV based on the first request;

receive, at the vehicle assistance management system, a confirmation message from the first AV indicating an arrival of the second AV at the first location; and transmit, by the vehicle assistance management system, a command signal to the second AV to travel to the first location and perform a power transfer to the first AV by forming an electrical connection between a first onboard battery of the first AV and a second onboard battery of the second AV and initiating a charging session that transfers power from the second onboard battery to the first onboard battery.

10. The system of claim 9, wherein the first request is automatically generated by the first AV in response to first data collected by a first sensor onboard the first AV.

11. The system of claim 10, wherein the first sensor is one of a tire pressure gauge, a temperature sensor, and a battery capacity sensor.

12. The system of claim 10, wherein the first request includes a description of first data, and the method further comprises selecting, by the vehicle assistance management system, the second AV based on the first data.

13. The system of claim 9, wherein the instructions further cause the processor to monitor, at the vehicle assistance management system, conditions related to the first AV as provided by an onboard telematics device of the first AV including a remaining battery charge of the first AV, as well as a cash balance being transported onboard the first AV via its cashflow monitor module.

14. The system of claim 9, wherein the second AV performs the power transfer to the first AV, and the instructions further cause the processor to:

receive, at the vehicle assistance management system and from the first AV, real-time feedback regarding a battery level of the first AV; and transmit, by the vehicle assistance management system, a stop command when the feedback indicates sufficient power has been restored to the first AV.

* * * * *